United States Patent [19]

Osgood

[11] Patent Number: 5,808,424
[45] Date of Patent: Sep. 15, 1998

[54] ILLUMINATED POWER LINE MARKER

[76] Inventor: George M. Osgood, 5539 SW. Westdale St., Portland, Oreg. 97221

[21] Appl. No.: 568,782

[22] Filed: Dec. 7, 1995

[51] Int. Cl.⁶ .................................................... H01J 15/04
[52] U.S. Cl. ............................ 315/344; 315/76; 340/983
[58] Field of Search .................... 315/248, 344, 315/76, 227 R, 208; 340/983

[56] References Cited

U.S. PATENT DOCUMENTS

| | | | |
|---|---|---|---|
| 1,976,378 | 10/1934 | Vrooman | 315/76 |
| 2,026,770 | 1/1936 | Bergman | 315/76 |
| 2,095,306 | 10/1937 | Austin | 315/76 |
| 4,474,133 | 10/1984 | Anderson et al. | 116/209 |
| 4,885,835 | 12/1989 | Osgood | 29/463 |
| 5,001,402 | 3/1991 | Milton et al. | 315/344 |
| 5,208,577 | 5/1993 | Herzberg | 340/310 R |
| 5,361,018 | 11/1994 | Milton | 315/248 |
| 5,594,303 | 1/1997 | Simpson et al. | 315/39 |

FOREIGN PATENT DOCUMENTS

1660092-A1  6/1991  U.S.S.R. .

OTHER PUBLICATIONS

American Electricians' Handbook, pp. 68–71, 262–265, 1376–1387, and 1402–1405.

*Primary Examiner*—Robert J. Pascal
*Assistant Examiner*—David H. Vu
*Attorney, Agent, or Firm*—Kolisch, Hartwell, Dickinson, McCormack & Heuser

[57] ABSTRACT

A line marker including hollow shell halves assembled about an elevated line and luminous tubes mounted on the shell halves illuminated by the electric field extending about the power line and without electrical connection with the power line itself.

7 Claims, 1 Drawing Sheet

ILLUMINATED POWER LINE MARKER

BACKGROUND AND SUMMARY OF THE INVENTION

This invention relates to what are referred to herein as line markers. More particularly, the invention concerns a marker of a type that is mounted on a suspended line, such as a power line, and which, when in operative position, provides a visually discernible body readily seen by pilots operating aircraft within the vicinity of the line thus to avoid possible collision.

Power lines typically are suspended from spaced towers and in certain instances, as when a line extends across a canyon or a river or the like, may have substantial elevation over the ground, with the towers supporting them being widely spaced. Because of these and other factors affecting visibility, the lines represent a hazardous condition for aircraft. To reduce the hazard involved, so-called line markers have been devised which are suspended by the power line to be carried by it, and which, by reason of their size, color, etc., provide a conspicuous marking alerting aircraft operators to the presence of the line.

A general object of this invention is to provide an improved line marker which provides a means providing illumination of the marker whereby the marker becomes more readily discernible, particularly at night.

As already indicated, a marker in operative position frequently is in a position suspended well above the ground, and such a marker is installed by a workman occupying a platform suspended in the air, as from a helicopter. Because of the operating conditions involved, any lighting system provided for a marker should be highly reliable, and operable over an extended period of time, without supervision or maintenance. Included within the objects of the invention, therefore, is to provide a power line marker for suspension on a high voltage transmission line where the means for illuminating the marker takes the form of a luminous tube containing an ionizable material which is ignited by the field surrounding a power transmission line to produce a light visually discernable by pilots, etc. Illumination is obtained without the need of batteries or other storage systems for electrical power, obviously contributing to longevity and maintenance-free operation.

In the marker contemplated, a body is provided which is adapted to be mounted on the power line. A luminous tube containing ionizable material ignited by the electric field surrounding the line is disposed adjacent the body with the body and tube together providing the visually distinctive marker.

The marker contemplated need not be provided with any direct electrical connection of a luminous tube with the power line itself. The contents of the tube produces illumination with ionization and illumination of the tube's contents produced by the field around the line.

These and various other objects and advantages are obtained by the invention, which described herein below in conjunction with the accompanying drawings, wherein:

DETAILED DESCRIPTION OF THE PREFERRED EMBODIMENT

Figure 1:
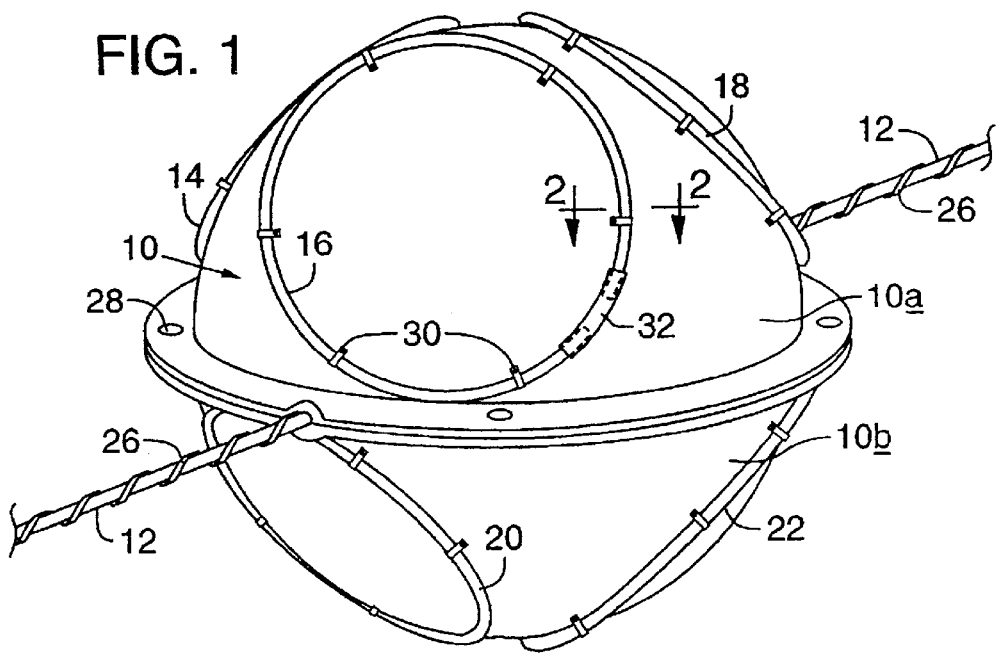
FIG. 1 is a perspective view illustrating a marker as contemplated according to one embodiment of the invention.
Figure 2:
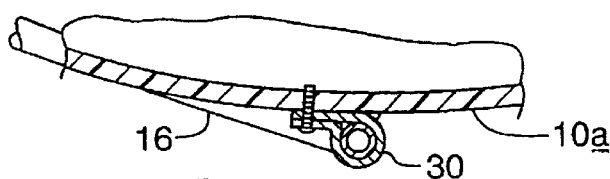
FIG. 2 is a cross-sectional view, somewhat enlarged, taken generally along the line 2—2 in FIG. 1.

Describing an embodiment of the invention, and referring initially to FIGS. 1 and 2, a marker as contemplated includes a body 10 shown detachably mounted on a power line, indicated at 12. Multiple elongate luminous tubes, shown at 14, 16, 18 and 20, are mounted in a position supported against the exterior surface of body 10 and supported by the body in spaced relation to power line 12.

Body 10 has a generally spherical configuration or outline. In the form of the invention illustrated in FIG. 1, where the tubes are supported on the exterior of the body, the body may be made of an opaque suitable plastic material, and have an orange or other distinctive color whereby it is rendered readily visible. Anchoring the body in place on the power line are wire strands 26 which extend out from opposite sides of the body and are twisted in generally spiral fashion about the power line. These wire strands have inner ends (not shown) secured in a suitable manner to the interior of the body 10.

Body 10 is a hollow shell made up of shell halves 10a, 10b suitably secured together as with fasteners 28. The shell halves are brought together and assembled together on opposite sides of a power line which extends through the body between the halves. A marker body of the type herein described suitably secured to a power line is more fully described in prior issued U.S. Pat. No. 4,885,835, issuing Dec. 12, 1989.

Each luminous tube comprises a vacuum-tight glass tube which has within it a small amount of a rare gas. A common tube of this description is the so-called neon tube commonly found in providing the lighting in a neon sign. Each tube extends as a continuous loop about a portion of the exterior of body 10. A mounting for each tube on the exterior of the body is provided by multiple brackets 30, each joined in a suitable manner to a shell half and having appropriately secured thereto a portion of the neon tube which it supports.

Each of the neon tubes, i.e., luminous tubes 14–22, may be constructed in a manner which is conventional for neon tubing found in lighting applications. Describing a specific construction, each tube included a glass body of approximately ½-inch OD which in manufacture of the neon tube is evacuated, then to have introduced to its interior a small amount of neon gas, for example gas at a pressure of 10 microns of mercury. The tube is shaped to extend in a circular course with opposite closed ends lined directly adjacent each other. These ends may be connected together as with covering 32.

The usual neon tube is provided with a metal terminal or electrode at each of its opposite ends, and these electrodes in a neon sign are electrically joined to opposite poles of an alternating current supply. In the marker with lighting of the instant invention, there is no electrical connection of electrodes in the neon tube with the power line or other electrical source. The luminous tubes instead are excited and caused to illuminate by the electric field which extends about the power line with the power line carrying current at high voltage. A neon filled tube, therefore, with no electrodes can be used, or if electrodes are present these are merely taped off when opposite ends are brought together with wrapping 32.

With the luminous tube devoid of internal electrode structure connected to the power line, and with the inert gas within the tube being excited instead by the electric field which extends about the power line, mounting of the marker in proper position on the line is greatly simplified, with there being no need to produce any electrical connections. Further, problems of inadvertent shorting are eliminated such as might be caused by moisture conditions, or dust conditions, where the marker is employed.

A power line marker as just described may be used with power lines carrying alternating current at voltages within the range of about 40 kilovolts to 150 kilovolts. When installed on such a power line, the luminous tube described, and without the need for direct electrical connection, are caused to ignite and produce light relying solely on the electric field which extends about the power line with the line carrying electricity at the voltages indicated.

Figure 3:
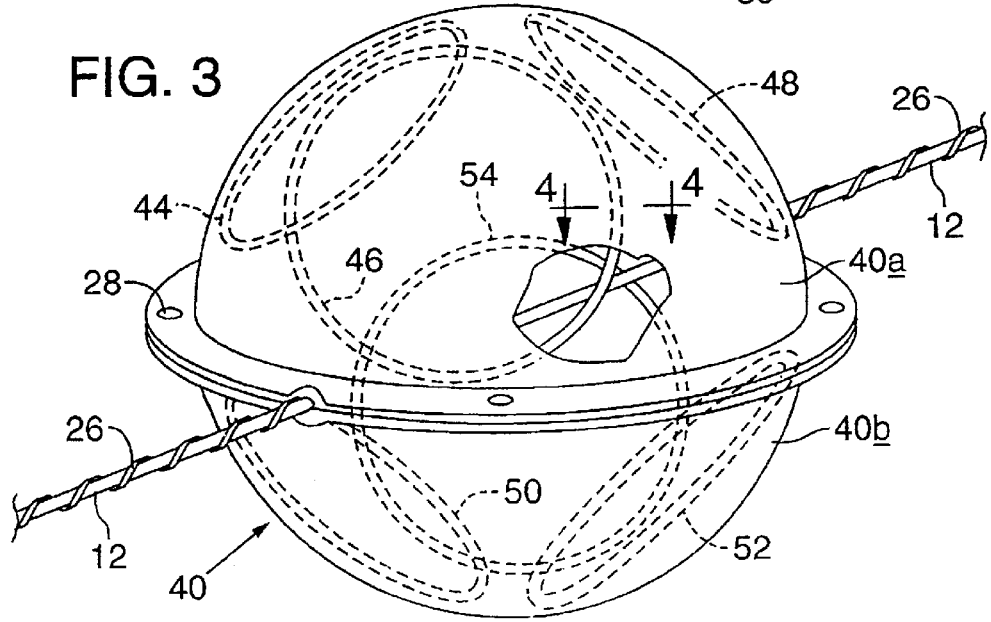
FIG. 3 is a perspective view, with portions broken away, illustrating a modification of the invention.
Figure 4:
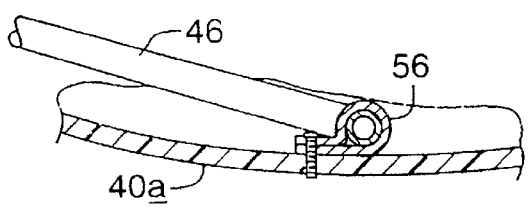
FIG. 4 is a cross-sectional view, somewhat enlarged, taken generally along the line 4—4 in FIG. 3.

FIGS. 3 and 4 illustrate a modification of the invention wherein the luminous tubes are mounted within the interior of the hollow body, or against the inner sides of the shell halves which make up the body. In this way, the shell halves of the body provide protection for the luminous tubes after the marker has been installed.

Considering FIGS. 3 and 4, the body 40 illustrated is made up of shell halves 40a and 40b. Again these are suitably secured together as with fasteners 28. The power transmission line 12 extends through the hollow body. Mounted against the interior surfaces of shell halves 40a, 40b are luminous tubes 44, 46, 48, 50, 52, and 54. Each tube may be constructed as discussed in connection with tubes 14-22. A tube is supported in place as with brackets 56 suitably anchored against the shell halves and having the luminous tubes carried at their outer extremities.

With the modification of the invention shown in FIGS. 3 and 4, a light transmitting, i.e., transparent plastic is preferably employed for the shell halves. Exemplary of such plastic is a clear ABS plastic which has the suitable stiffness and also is substantially transparent.

The tubes in the modification shown in FIGS. 3 and 4 are caused to illuminate by reason of the electric field extending about the power line in the same manner as the tubes discussed in connection with FIGS. 1 and 2. The lighted tubes are readily discernible to viewers of the outside of the marker.

While preferred embodiments have been illustrated and described above, the configuration of the tubes need not be restricted, in all instances, to circle shapes, nor is body 10 in all cases restricted to a general spherical configuration. Thus, the tubes can be configured as helical shapes, or as long spirals, and still operate satisfactorily. The body may take the form of disc-shaped halves with the tubes disposed within the interior of the mating halves. It should be understood, however, with the constructions specifically illustrated, ease of assembly is assured, optimum wind resistance characteristics are obtained, and effective lighting readily observed from all angles results.

While modifications of the invention have been described, it should be obvious that variations and other modifications are possible.

I claim:

1. A power line marker comprising, in operative position:

a body adapted to be mounted on a power line and said body being visually discernible as a marker, and a luminous tube mounted on said body containing an ionizable material ignited by the electrical field surrounding a power line to produce a visually discernible light extending along the tube;

said tube being devoid of internal electrode structure electrically connected to the power line.

2. The power line marker of claim 1, wherein said body is a shell with a hollow interior and is adapted to be mounted on a power line with the line passing through the interior of the shell, and the luminous tube is supported within the interior of said shell to be protected by the shell.

3. The power line marker of claim 1, wherein said body has a hollow interior and is of approximately spherical outline, and said tube is supported on said body within the interior of said body.

4. The power line marker of claim 1, wherein said tube extends as a continuous loop adjacent said body.

5. A power line and marker combination comprising:

a hollow body, said body including multiple shell members assembled together with the power line passing through the body, and a luminous tube extending adjacent and mounted on at least one of said shell members;

said tube being devoid of internal electrode structure electrically connected to the power line.

6. The power line and marker combination of claim 5, wherein the luminous tube extends as a continuous loop.

7. The power line and marker combination of claim 6, wherein the tube is supported on the inside of said body and the tube is discernible through said body.

* * * * *